United States Patent [19]

Pekarek

[11] Patent Number: 4,701,297

[45] Date of Patent: Oct. 20, 1987

[54] APPARATUS AND METHOD FOR REMOVING THERMOCOUPLES FROM NUCLEAR REACTOR VESSEL

[75] Inventor: William R. Pekarek, Plum Borough, Pa.

[73] Assignee: Westinghouse Electric Corp., Pittsburgh, Pa.

[21] Appl. No.: 654,698

[22] Filed: Sep. 26, 1984

[51] Int. Cl.⁴ .............................................. G21C 19/00
[52] U.S. Cl. ................................................... 376/260
[58] Field of Search ............... 376/227, 245, 260, 463; 294/86.4, 86.23

[56] References Cited

U.S. PATENT DOCUMENTS

| | | |
|---|---|---|
| 3,168,140 | 2/1965 | Bodine . |
| 3,393,002 | 7/1968 | Woolley ............................ 294/86.23 |
| 3,583,752 | 6/1971 | Panissidi ............................ 294/86.4 |
| 3,899,390 | 8/1975 | Klein et al. .......................... 376/245 |
| 4,313,793 | 2/1982 | Klumb et al. ........................ 376/260 |

FOREIGN PATENT DOCUMENTS 2151676  4/1973  Fed. Rep. of Germany .

Primary Examiner—Deborah L. Kyle
Assistant Examiner—Richard L. Klein

[57] ABSTRACT

A clamp is applied to a thermocouple of a nuclear reactor vessel at a location above the level of the vessel head, the clamp being supported on a chain or cable block which is coupled through a load cell to an overhead crane. A vibrator is mounted on the clamp. The thermocouple is withdrawn by pulling it longitudinally upwardly with a predetermined force and, if it does not move, vibrating it by applying vibratory energy at an angle of about 20° of its longitudinal axis of the thermocouple. The pulling force is then periodically increased by 45-kg increments until longitudinal movement of the thermocouple begins.

16 Claims, 5 Drawing Figures

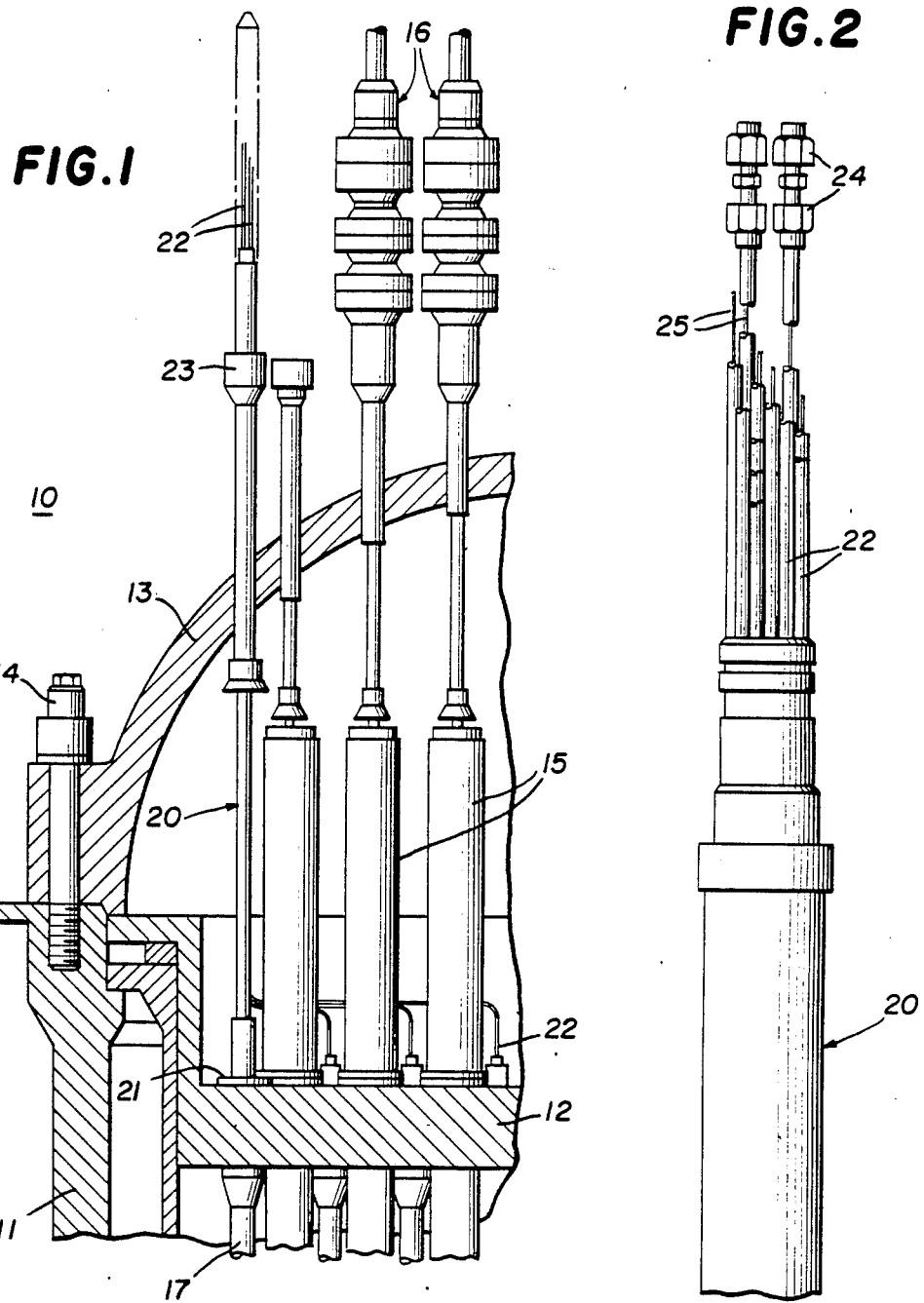

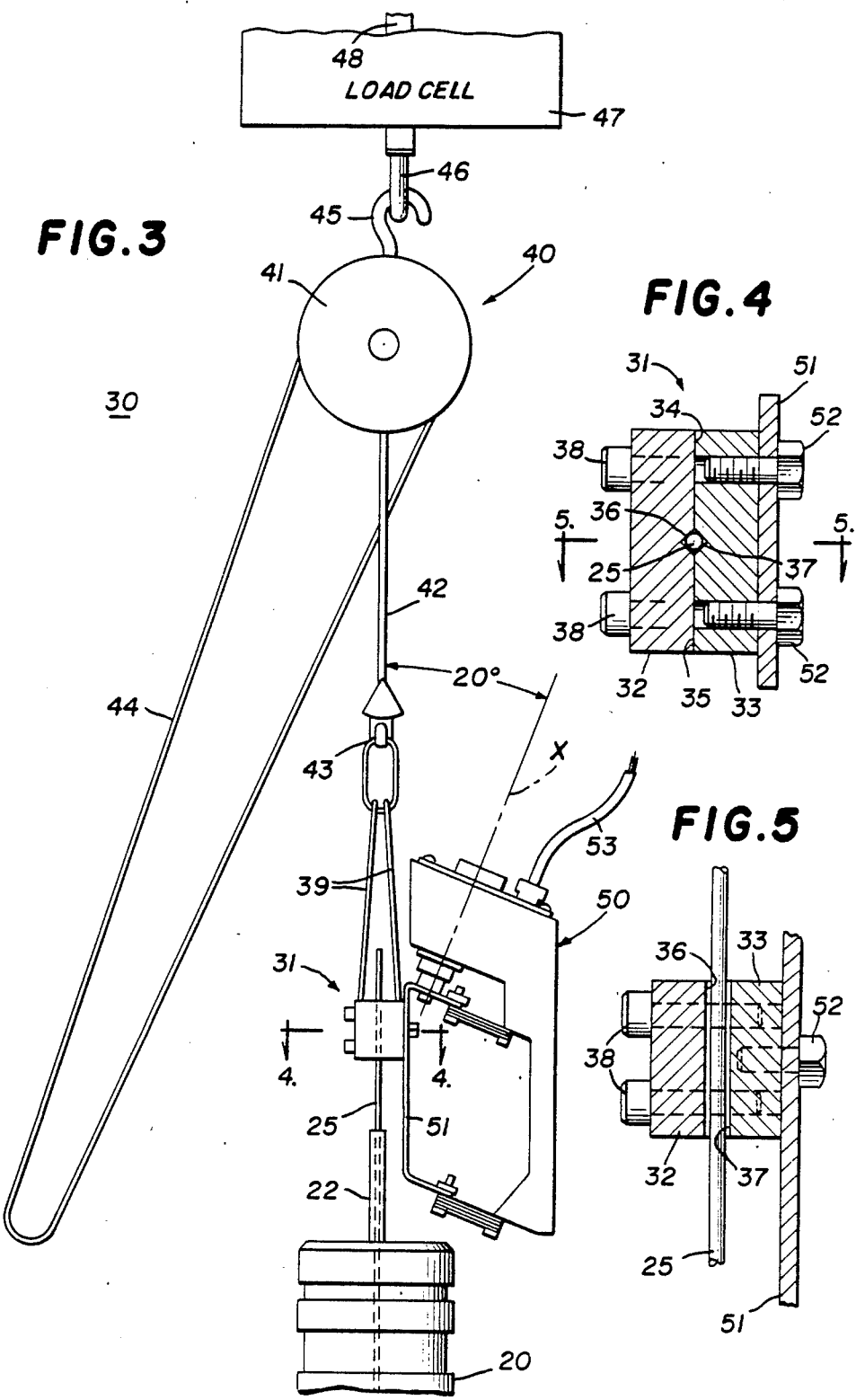

APPARATUS AND METHOD FOR REMOVING THERMOCOUPLES FROM NUCLEAR REACTOR VESSEL

BACKGROUND OF THE INVENTION

1. Field of the Invention

The present invention relates to extraction or removal of elongated wire or rod-like elements from surrounding sheaths or conduits in which they have become stuck or lodged. The invention has particular application to the removal of thermocouples from their conduits in nuclear reactor vessels.

2. Description of the Prior Art

In monitoring the power distribution of the reactor core of a nuclear reactor, various instrumentation is used. One type of instrumentation is incore instrumentation, which includes fuel assembly outlet thermocouples. The thermocouples are located above the upper core plate at preselected fuel assembly locations. Each thermocouple is approximately 6 to 9 meters in length and about 3 to 4 mm in diameter, sheathed in stainless steel. Each thermocouple is disposed in a conduit 13, such thermocouple conduits being disposed in a thermocouple column in the upper internals of the reactor. In a four-loop reactor, there are five such thermocouple columns, for a total of 65 thermocouples.

During reactor refueling, the thermocouple electrical terminals must be disconnected from each of the thermocouples in order to permit removal of the reactor head. During this operation, it is common for an instrument column or one or more of the thermocouples therein to be damaged. In that event, the thermocouples must be removed from their conduits in the damaged column, or individual damaged thermocouples must be removed. This is accomplished by pulling the thermocouples upwardly.

However, frequently the thermocouples become stuck or lodged in their conduits. This can occur as a result of corrosion, for example, and is particularly common in reactors which have been in use for an extended period of time. In the event of a stuck thermocouple, the removal pulling force must be increased until, ultimately, if the thermocouple is not freed, it eventually stretches and breaks.

Attempts have been made to facilitate removal of stuck thermocouples without breaking them. One such technique involves the flowing of warm water down the thermocouple conduit for a long period of time (up to 10 or 12 hours per thermocouple, for example), in an attempt to loosen the thermocouple. But this process is very time consuming and requires separate attachment means and auxiliary heaters and the like. Furthermore, it requires considerable man-rem exposure.

SUMMARY OF THE INVENTION

It is a general object of the present invention to provide an improved method and apparatus for removing thermocouples from nuclear reactors, which avoids the disadvantages of prior methods and apparatus, while affording additional structural and operating advantages.

An important object of the invention is the provision of a relatively quick method for removal of stuck thermocouples.

Another object of the invention is the provision of a method of the type set forth, which minimizes man-rem exposure.

Still another object of the invention is the provision of a method which is relatively simple and economical, yet effective.

In connection with the foregoing objects, it is another object of the invention to provide apparatus for performing the method set forth.

Certain of these objects are attained by providing apparatus for removing an elongated thermocouple from a thermocouple conduit which extends through the head of a nuclear reactor vessel, the apparatus comprising: vibration means adapted to be mechanically coupled to the thermocouple for vibrating the thermocouple at a predetermined frequency, and pulling means for applying to the thermocouple an upward pulling force longitudinally of the thermocouple.

Other objects of the invention are attained by providing a method for removing an elongated thermocouple from a thermocouple conduit which extends through the head of a nuclear reactor vessel, the method comprising the steps of: tensioning the thermocouple by pulling it longitudinally upwardly with a predetermined force, and vibrating the thermocouple.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a fragmentary, sectional view of the upper end of the nuclear reactor vessel, showing one of the thermocouple columns;

FIG. 2 is an enlarged, fragmentary side elevational view of the upper portion of the thermocouple column of FIG. 1, with portions removed to show the thermocouples and their conduits;

FIG. 3 is a still further enlarged view of the removal apparatus of the present invention applied to one of the thermocouples of the column of FIG. 2;

FIG. 4 is a still further enlarged view in horizontal section taken along the line 4—4 in FIG. 3; and FIG. 5 is a fragmentary view in vertical section taken along the line 5—5 in FIG. 4.

DESCRIPTION OF THE PREFERRED EMBODIMENT

Referring to FIG. 1, there is illustrated the upper portion of a nuclear reactor vessel, generally designated by the numeral 10, which includes a generally cylindrical vessel wall 11 provided at the upper end thereof with a top support plate 12. Closing the vessel wall 11 at its upper end above the top support plate 12 is a generally dome-shaped vessel head 13 secured in place by a plurality of threaded fasteners 14.

Mounted on the top support plate 12 are a plurality of control rod guide tubes 15, each of which is provided with a control rod drive mechanism 16 disposed above the vessel head 13 and extending downwardly through complementary apertures therein. The control rod guide tubes 15 extend below the top support plate 12 and are interspersed with a plurality of support columns 17 (one shown). Also provided are a plurality of thermocouple columns 20 disposed above the top support plate 12.

Each of the thermocouple columns 20 is a cylindrical tubular member vertically disposed and provided at its lower end with a base plate 21 which is fixedly secured to the top support plate 12. Referring also to FIG. 2, each thermocouple column 20 contains a plurality of thermocouple conduits 22, typically 13 in number. Each of the thermocouple columns 20 extends upwardly through a complementary opening in the vessel head 13 and thereabove, being provided with a coupling joint 23. Each of the thermocouple conduits 22 is provided with a swage-lock fitting 24 which provides a seal pressure boundary between the conduit 22 and an elongated thermocouple 25 encased within the conduit 22. Each thermocouple 25 and its associated conduit 22 may be 6 to 9 meters in length, extending downwardly through the thermocouple column 20 and typically exiting the column 20 at a side opening therein a slight distance above the top support plate 12 and then leading to an associated thermocouple fittings in the top support plate 12 (see FIG. 1).

In order to remove the reactor vessel head 13 it is necessary to disconnect the thermocouples 25 and, during removal and replacement of the vessel head 13 it is not uncommon for the thermocouple conduits 20 or the thermocouples 25 thereof to be damaged. In that event, the thermocouples 25 must be removed from their conduits 22. This removal is frequently made difficult by sticking or locking of the thermocouples 25 in the conduits 22, as by reason of corrosion. In that event, it is very difficult to remove the thermocouples 25 without breaking them.

Accordingly, referring now also to FIGS. 3–5, the present invention provides a thermocouple removal apparatus, generally designated by the numeral 30, which greatly facilitates thermocouple removal. The removal apparatus 30 includes a clamp assembly 31 comprising two solid rectangular clamp members 32 and 33, respectively having flat, rectangular clamping faces 34 and 35. The clamping faces 34 and 35 are respectively provided with vertical grooves 36 and 37 extending the length thereof centrally thereof, each of the grooves 36 and 37 being substantially V-shaped or semi-cylindrical in transverse cross section, with a diameter very slightly less than than of the thermocouples 25. In use, the clamping members 32 and 33 are held together with the clamping faces 34 and 35 in abutting relationship, by bolts 38 which are received through complementary bores in the clamping member 32 and threadedly engaged in internally threaded bores in the clamping member 33.

Each of the clamping members 32 and 33 has fixedly secured to the upper surface thereof a generally inverted U-shaped bail 39, the legs of each bail 39 being secured, as by welding, to the associated one of the clamping members 32 and 33. The bails 39 are adapted to be supported from overhead by a chain or cable block assembly 40. More specifically, the block assembly 40 includes sheaves 41 (one shown), from one of which depends a support cable 42 which carries a shackle 43 which is coupled to the bails 39. The block assembly 40 also includes a control chain or cable 44 in a known manner. The block assembly 40 also is provided with a support hook 45 which is adapted to be coupled to the hook or eye 46 of an associated load cell 47 to measure the pulling force, which is in turn supported by the cable 48 of an associated overhead crane (not shown).

A vibrator assembly 50 is fixedly secured to the clamp member 33. More specifically, the vibrator assembly 50 has a coupling plate 51 which is fixedly secured to the outer side surface of the clamping member 33 by a pair of bolts 52 which are threadedly engaged in complementary bores in the coupling member 33. The vibrator assembly 50 is provided with a control cable 53 which extends to an associated control unit (not shown) for supplying power to the vibrator assembly 50 and for controlling the vibrational frequency thereof.

The vibrator assembly 50 may be a Model F-T0 light capacity electromagnetic vibrator, sold by FMC Corporation under the trademark "SYNTRON". This particular vibrator assembly is designed to operate at about 3,600 cycles per minute. However, it will be appreciated that other vibrator assemblies could be utilized with different power capacities and different vibrational frequency operating ranges.

The vibrator assembly 50 applies vibrational forces to the clamping member 33 through the coupling plate 51 along an axis X which is inclined at an angle of about 20° with respect to the plane of the clamping face 35 and, therefore, with respect to the longitudinal axis of the groove 37. However, it will be appreciated that vibrator assemblies could be used which apply the vibrational forces either axially of the groove 37 or at other angles with respect thereto.

In operation, the clamp assembly 31, with the vibrator assembly 50 mounted on the clamping member 33, is initially supported from the block assembly 40 and is lowered into position over the upper end of the selected one of the thermocouples 25 to be removed. The clamp assembly 31 is then fixedly clamped to the thermocouple 25, as indicated in FIGS. 3–5. More specifically, the thermocouple 25 is seated in the grooves 36 and 37, which are dimensioned so as firmly to grip the thermocouple 25 when the clamping faces 34 and When the removal apparatus 30 has thus been coupled to the thermocouple 25, the block assembly 40 is operated to apply a predetermined upward pulling force axially of the thermocouple 25, this initial force preferably being about 112 kg. The thermocouple 25 is observed to determine if any axial movement occurs. If so, the withdrawal continues, the force exerted by the block assembly 40 being varied, as necessary, to continue the axial withdrawal movement of the thermocouple 25 from its associated conduit 22.

If, upon application of the initial withdrawal force, the thermocouple 25 does not move, it is placed in tension by the withdrawal force. Then, the vibrator assembly 50 is turned on to vibrate the thermocouple 25 at about 3,600 cycles per minute while it is under tension. This vibrational force is applied for about 30 minutes. Application of the vibrational force along the axis X, inclined to the longitudinal axis of the thermocouple 25 at an angle of about 20°, has been found to provide improved results, as compared to vibrational forces applied axially of the thermocouple 25.

The combination of the vibration and tension in the thermocouple 25 creates standing waves therein, which concentrate low level energy at points of binding of the thermocouple 25 in the conduit 22 and facilitating freeing of this bind. The thermocouple 25 is monitored during the vibration thereof to determine if axial vertical movement thereof has begun. If the thermocouple 25 loosens and begins to come out of the conduit 22, the block assembly 40 is tensioned enough to maintain the withdrawal movement.

If, after about 30 minutes of vibration the thermocouple 25 has not moved, the block assembly 40 is adjusted to increase the tension to about 157 kg and the vibration is then continued for another 30 minutes and monitored in the same manner as described above. This process continues at 45-kg incremental increases in tension every 30 minutes until the thermocouple is extracted or until it breaks. Normally, thermocouple breakage will occur when the tension exceeds about 337 kg.

It has been found that application of the vibrational forces to the thermocouples while they are under tension served to free most thermocouples without breakage. This process and apparatus of the present invention permits removal of thermocouples in, at most, a few hours and, in any event, much more rapidly than prior art techniques. Accordingly, it can be seen that there has been provided an improved method and apparatus for thermocouple removal which is of simple and economical construction and operation, and which effects relatively rapid thermocouple removal with minimal breakage, while also minimizing man-rem exposure.

I claim as my invention:

1. A method for removing an elongated thermocouple from a thermocouple conduit which extends through the head of a nuclear reactor vessel, said method comprising the steps of: tensioning the thermocouple by gripping it at a predetermined location and pulling it longitudinally upwardly with a predetermined force, and directly vibrating the tensioning means and thereby the thermocouple by applying to the tensioning means at said predetermined location a vibratory force in a direction inclined at a predetermined angle with respect to the longitudinal axis of the thermocouple.

2. The method of claim 1, wherein the thermocouple is vibrated while it is in tension.

3. The method of claim 2, wherein the thermocouple is placed in tension before it is vibrated.

4. The method of claim 2, wherein the initial tensioning force applied to the thermocouple is approximately 112 kg.

5. The method of claim 2, and further including the step of increasing the tensioning force applied to the thermocouple after it has been vibrated for a predetermined period of time without substantial longitudinal movement.

6. The method of claim 5, and further including the step of periodically increasing the tensioning force applied to the thermocouple until it begins longitudinal movement.

7. The method of claim 5, wherein the tensioning force is increased in increments of about 45 kg.

8. The method of claim 1, wherein said predetermined angle is substantially 20°.

9. The method of claim 1, wherein the thermocouple is vibrated at a frequency of about 3,600 cycles per minute.

10. In a nuclear reactor vessel having an elongated thermocouple encased in a thermocouple conduit which extends through the head of said nuclear reactor vessel, an apparatus for removing said elongated thermocouple from the thermocouple conduit comprising: pulling means for applying to the thermocouple an upward pulling force longitudinally of the thermocouple, vibration means, and means for mechanically coupling said vibration means directly to said pulling means for applying thereto a vibratory force in a direction which is inclined at a predetermined angle with respect to the longitudinal axis of the thermocouple for vibrating the thermocouple at a predetermined frequency.

11. The apparatus of claim 10, and further including means for measuring the pulling force applied to the thermocouple.

12. In a nuclear reactor vessel having an elongated thermocouple encased in a thermocouple conduit which extends through the head of said nuclear reactor vessel, an apparatus for removing said elongated thermocouple from the thermocouple conduit comprising: gripping means for fixedly engaging the thermocouple above the level of the reactor vessel head, tension means, first coupling means for coupling said tension means to said gripping means for applying thereto and to the gripped thermocouple a predetermined upward force longitudinally of the thermocouple for placing the thermocouple in tension, vibration means, and second coupling means for mechanically coupling said vibration means directly to said gripping means for applying thereto a vibratory force in a direction which is inclined at a predetermined angle with respect to the longitudinal axis of the thermocouple for vibrating the thermocouple at a predetermined frequency while it is in tension.

13. The apparatus of claim 12, wherein said gripping means comprises two clamping members disposable in clamping engagement with the thermocouple.

14. The apparatus of claim 13, wherein said second coupling means includes means carried by one of said clamping members.

15. The apparatus of claim 14, wherein said first coupling means includes means coupled to both of said clamping members.

16. The apparatus of claim 4, wherein said predetermined angle is substantially 20°.

* * * * *